(12) United States Patent
Strope et al.

(10) Patent No.: US 9,123,331 B1
(45) Date of Patent: *Sep. 1, 2015

(54) TRAINING AN AUTOMATIC SPEECH RECOGNITION SYSTEM USING COMPRESSED WORD FREQUENCIES

(71) Applicant: Google Inc., Mountain View, CA (US)

(72) Inventors: Brian Strope, Mountain View, CA (US); Mitchel Weintraub, Mountain View, CA (US)

(73) Assignee: Google Inc., Mountain View, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 13/967,965

(22) Filed: Aug. 15, 2013

Related U.S. Application Data

(63) Continuation of application No. 13/666,223, filed on Nov. 1, 2012, now Pat. No. 8,543,398.

(60) Provisional application No. 61/604,849, filed on Feb. 29, 2012.

(51) Int. Cl.
*G10L 15/06* (2013.01)
(52) U.S. Cl.
CPC .................................... *G10L 15/063* (2013.01)
(58) Field of Classification Search
USPC ......................................... 704/235, 251–257
See application file for complete search history.

(56) References Cited

U.S. PATENT DOCUMENTS

| | | | |
|---|---|---|---|
| 5,864,810 A | 1/1999 | Digalakis et al. | |
| 5,895,447 A | 4/1999 | Ittycheriah et al. | |
| 6,236,963 B1 | 5/2001 | Naito et al. | |
| 6,418,411 B1 | 7/2002 | Gong | |
| 6,567,776 B1 | 5/2003 | Chang et al. | |
| 6,804,647 B1 | 10/2004 | Heck et al. | |
| 7,668,718 B2 | 2/2010 | Kahn et al. | |
| 2010/0169094 A1 | 7/2010 | Akamine et al. | |

OTHER PUBLICATIONS

Velivelli et al.; Automatic Video Annotation by Mining Speech Transcripts; Computer Vision and Pattern Recognition Workshop, 2006, pp. 1-8.*
Fontanari et al.; Minimal models for text production and Zipf's law; Integration of Knowledge Intensive Multi-Agent Systems, Pub. Date: 2005, pp. 297-300.*
Wentian Li; Random Texts Exhibit Zipf's Law-Like Word Frequency Distribution, Information Theory, IEEE Trasactions on vol. 38, Issue:6, Publication Year: 1992, pp. 1842-1845.*

* cited by examiner

*Primary Examiner* — Abul Azad
(74) *Attorney, Agent, or Firm* — McDonnell Boehnen Hulbert & Berghoff LLP

(57) ABSTRACT

Respective word frequencies may be determined from a corpus of utterance-to-text-string mappings that contain associations between audio utterances and a respective text string transcription of each audio utterance. Respective compressed word frequencies may be obtained based on the respective word frequencies such that the distribution of the respective compressed word frequencies has a lower variance than the distribution of the respective word frequencies. Sample utterance-to-text-string mappings may be selected from the corpus of utterance-to-text-string mappings based on the compressed word frequencies. An automatic speech recognition (ASR) system may be trained with the sample utterance-to-text-string mappings.

20 Claims, 9 Drawing Sheets

TRAINING AN AUTOMATIC SPEECH RECOGNITION SYSTEM USING COMPRESSED WORD FREQUENCIES

CROSS-REFERENCE TO RELATED APPLICATION

The present application claims priority to U.S. patent application Ser. No. 13/666,223, filed on Nov. 1, 2012, and herein incorporated by reference in its entirety. U.S. patent application Ser. No. 13/666,223, in turn, claims priority to U.S. provisional patent application No. 61/604,849, filed on Feb. 29, 2012, and herein incorporated by reference in its entirety.

BACKGROUND

A goal of automatic speech recognition (ASR) technology may be to map a particular audio utterance to an accurate textual representation of that utterance. For instance, ASR performed on the utterance "cat and dog" would ideally be mapped to the text string "cat and dog," rather than the nonsensical text string "skate and hog," or the sensible but inaccurate text string "Kate and Doug." ASR systems can be trained based on a large corpus of utterance-to-text-string mappings. However, ASR system performance may vary based on the characteristics of this corpus.

SUMMARY

In a first example embodiment, respective word frequencies may be obtained from a corpus of utterance-to-text-string mappings. The corpus of utterance-to-text-string mappings may contain associations between audio utterances and respective text string transcriptions of the audio utterances. The respective word frequencies may be based on occurrences of words in the text string transcriptions. Respective compressed word frequencies may be determined based on the respective word frequencies. For instance, a first distribution of the respective word frequencies may have a higher variance than a second distribution of the respective compressed word frequencies. Sample utterance-to-text-string mappings may be selected from the corpus of utterance-to-text-string mappings based on the compressed word frequencies, and an ASR system may be trained with the sample utterance-to-text-string mappings.

A second example embodiment may include a non-transitory computer-readable storage medium, having stored thereon program instructions that, upon execution by a computing device, cause the computing device to perform operations in accordance with the first example embodiment.

A third example embodiment may include a computing system comprising at least one processor, data storage, and program instructions stored in the data storage that, upon execution by the at least one processor, cause the computing system to operate in accordance with the first example embodiment.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

1. Overview

Figure 1:
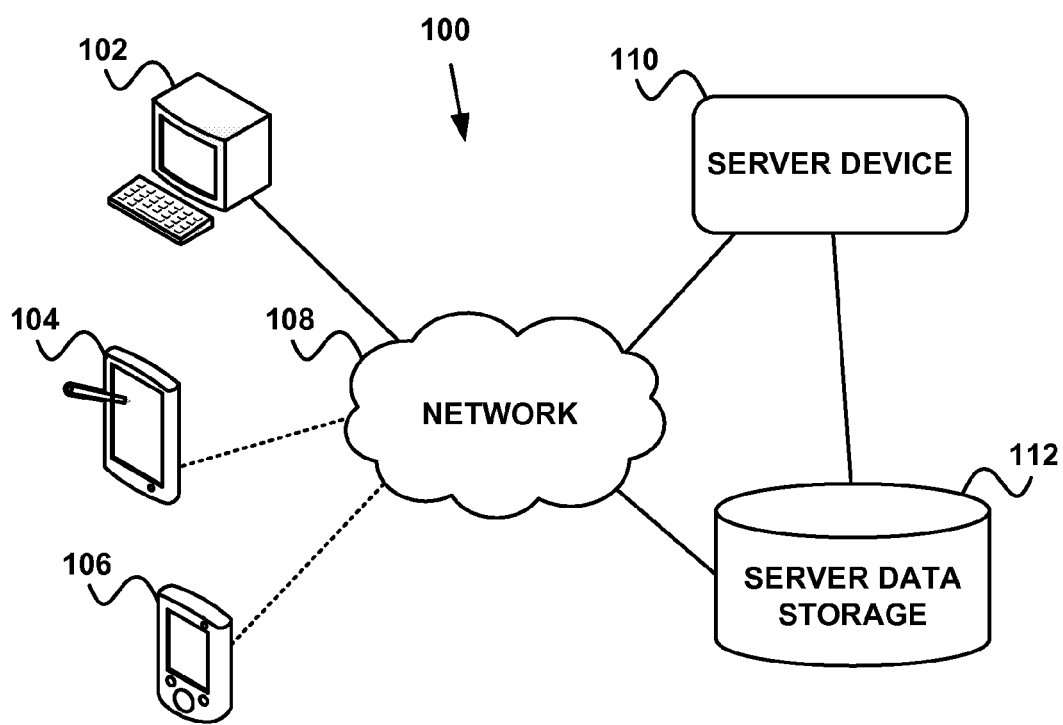
FIG. 1 depicts a distributed computing architecture, in accordance with an example embodiment.

A corpus of utterance-to-text-string mappings may be used to train an ASR system. In particular, these mappings may contain a quantity of audio utterances (e.g., audio files of human speech). In some implementations, there may be thousands, tens of thousands, hundreds of thousands, tens of millions, or more audio utterances. The mappings may associate each audio utterance with a manually-transcribed and/or automatically-transcribed text string of that audio utterance. Possibly using various mathematical and/or machine learning techniques, the ASR system may use the corpus to develop probabilistic mappings between sounds and phonemes, phoneme patterns and words, and/or words and word frequencies. These probabilistic mappings may be represented as a search graph.

In some embodiments, the ASR system may be trained offline, prior to becoming operational. For example, training an ASR system with a large corpus may take several hours or days. On the other hand, the ASR system may instead be trained online. In the latter case, the ASR system may be dynamically updated while operating.

The accuracy of the ASR system may depend, to some extent, on the size and/or quality of the data in the corpus. For example, words and phrases that appear more frequently in the corpus's audio utterances are more likely to be properly recognized by the ASR system, because the ASR system may have a greater opportunity to learn the proper mappings of these utterances to text strings. Conversely, words and phrases that appear less frequently in the audio utterances are less likely to be properly recognized by the ASR system, because the ASR system may have a lesser opportunity to learn the proper text string mappings.

Modern ASR systems are often trained with utterances from actual text-to-speech computer applications, perhaps used together with sound-to-text mappings generated by the ASR system. Thus, in some corpora, the utterances include actual human voice signals made during the use of, e.g., voice search and voice messaging applications.

However, the distribution of word frequencies is highly skewed (e.g., heavy-tailed) in many human languages. For example, empirical studies have shown that word frequencies of American English roughly follow Zipf's Law, in that the frequency of any word is approximately inversely proportional to its rank in frequency. Thus, the most frequent word will occur about twice as often as the second most frequent word, three times as often as the third most frequent word, and so on. Therefore, in a corpus of American English utterances, one might expect the most common word, "the" to be approximately 7% of all words, the second most common word, "of" to be approximately 3.5% of all words, the third most common word, "and" to be approximately 2.3% of all words, and so on.

Given that an ASR system can be trained by actual human speech and that this speech is likely to exhibit a Zipf distribution (or a distribution proximate thereto), the ASR system may become inherently biased against properly recognizing less common words and phrases. In the discussion below, various embodiments are presented that may compensate for this bias. Particularly, by training an ASR system with an increased amount of less common words and phrases and a decreased amount of more common words and phrases, the effect of this bias may be mitigated.

ASR systems have been deployed in various environments. Some ASR systems are just a single machine (e.g., a personal computer) into which a user speaks utterances and the ASR system transcribes the utterances into one or more text strings. Other ASR systems are client/server based, in which the user speaks an utterance into a client device, and the client device may encode the utterance and transmit it to a server device. Then, the server device performs speech recognition on the encoded utterance and transmits one or more text string mappings to the client device for presentation to the user. Particularly, on wireless communication devices such as mobile phones, client/server based ASR can be supported by Internet search applications, geo-location and mapping applications, text messaging and instant messaging applications, and by virtually any third-party application as well.

The server component of an ASR system may include just a single server device, or may be distributed in various ways across a number of server devices. The following section describes example client and server device(s) and an example communication system that could be used for client/server communication and processing by an ASR system.

2. Communication System and Device Architecture

The methods, devices, and systems described herein can be implemented using client devices and/or so-called "cloud-based" server devices. Under various aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that at least some of the methods, processes, and techniques disclosed herein may be able to operate entirely on a client device or a server device.

Furthermore, the "server devices" described herein may not necessarily be associated with a client/server architecture, and therefore may be interchangeably referred to as "computing devices." Similarly, the "client devices" described herein also may not necessarily be associated with a client/server architecture, and therefore may be interchangeably referred to as "user devices."

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

A. Communication System

FIG. 1 is a simplified block diagram of a communication system 100, in which various embodiments described herein can be employed. Communication system 100 includes client devices 102, 104, and 106, which represent a desktop personal computer (PC), a tablet computer, and a mobile phone, respectively. Each of these client devices may be able to communicate with other devices via a network 108 through the use of wireline connections (designated by solid lines) and/or wireless connections (designated by dashed lines).

Network 108 may be, for example, the Internet, or some other form of public or private Internet Protocol (IP) network. Thus, client devices 102, 104, and 106 may communicate using packet-switching technologies. Nonetheless, network 108 may also incorporate at least some circuit-switching technologies, and client devices 102, 104, and 106 may communicate via circuit switching alternatively or in addition to packet switching.

A server device 110 may also communicate via network 108. Particularly, server device 110 may communicate with client devices 102, 104, and 106 according to one or more network protocols and/or application-level protocols to facilitate the use of network-based or cloud-based computing on these client devices. Server device 110 may include integrated data storage (e.g., memory, disk drives, etc.) and may also be able to access a separate server data storage 112. Communication between server device 110 and server data storage 112 may be direct, via network 108, or both direct and via network 108 as illustrated in FIG. 1. Server data storage 112 may store application data that is used to facilitate the operations of applications performed by client devices 102, 104, and 106 and server device 110.

Although only three client devices, one server device, and one server data storage are shown in FIG. 1, communication system 100 may include any number of each of these components. For instance, communication system 100 may comprise millions of client devices, thousands of server devices and/or thousands of server data storages. Furthermore, client devices may take on forms other than those in FIG. 1.

B. Server Device

Figure 2A:
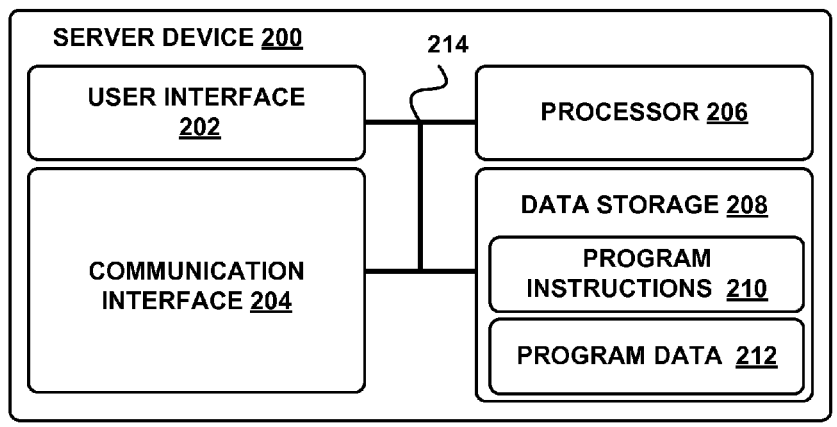
FIG. 2A is a block diagram of a server device, in accordance with an example embodiment.

FIG. 2A is a block diagram of a server device in accordance with an example embodiment. In particular, server device 200 shown in FIG. 2A can be configured to perform one or more functions of server device 110 and/or server data storage 112. Server device 200 may include a user interface 202, a communication interface 204, processor 206, and data storage 208, all of which may be linked together via a system bus, network, or other connection mechanism 214.

User interface 202 may comprise user input devices such as a keyboard, a keypad, a touch screen, a computer mouse, a track ball, a joystick, and/or other similar devices, now known or later developed. User interface 202 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 202 may be configured to generate audible output(s), via a speaker, speaker jack, audio output port, audio output device, earphones, and/or other similar devices, now known or later developed. In some embodiments, user interface 202 may include software, circuitry, or another form of logic that can transmit data to and/or receive data from external user input/output devices.

Communication interface 204 may include one or more wireless interfaces and/or wireline interfaces that are configurable to communicate via a network, such as network 108 shown in FIG. 1. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

Processor 206 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 206 may be configured to execute computer-readable program instructions 210 that are contained in data storage 208, and/or other instructions, to carry out various functions described herein.

Thus, data storage 208 may include one or more non-transitory computer-readable storage media that can be read or accessed by processor 206. The one or more computer-readable storage media may include volatile and/or non-volatile storage components, such as optical, magnetic, organic or other memory or disc storage, which can be integrated in whole or in part with processor 206. In some embodiments, data storage 208 may be implemented using a single physical device (e.g., one optical, magnetic, organic or other memory or disc storage unit), while in other embodiments, data storage 208 may be implemented using two or more physical devices.

Data storage 208 may also include program data 212 that can be used by processor 206 to carry out functions described herein. In some embodiments, data storage 208 may include, or have access to, additional data storage components or devices (e.g., cluster data storages described below).

C. Server Clusters

Server device 110 and server data storage device 112 may store applications and application data at one or more places accessible via network 108. These places may be data centers containing numerous servers and storage devices. The exact physical location, connectivity, and configuration of server device 110 and server data storage device 112 may be unknown and/or unimportant to client devices. Accordingly, server device 110 and server data storage device 112 may be referred to as "cloud-based" devices that are housed at various remote locations. One possible advantage of such "could-based" computing is to offload processing and data storage from client devices, thereby simplifying the design and requirements of these client devices.

In some embodiments, server device 110 and server data storage device 112 may be a single computing device residing in a single data center. In other embodiments, server device 110 and server data storage device 112 may include multiple computing devices in a data center, or even multiple computing devices in multiple data centers, where the data centers are located in diverse geographic locations. For example, FIG. 1 depicts each of server device 110 and server data storage device 112 potentially residing in a different physical location.

Figure 2B:
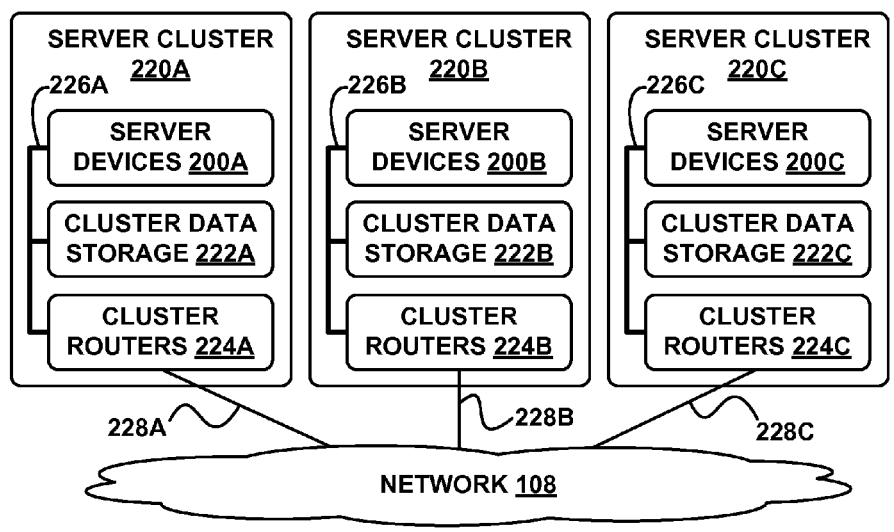
FIG. 2B depicts a cloud-based server system, in accordance with an example embodiment.

FIG. 2B depicts a cloud-based server cluster in accordance with an example embodiment. In FIG. 2B, functions of server device 110 and server data storage device 112 may be distributed among three server clusters 220A, 220B, and 220C. Server cluster 220A may include one or more server devices 200A, cluster data storage 222A, and cluster routers 224A connected by a local cluster network 226A. Similarly, server cluster 220B may include one or more server devices 200B, cluster data storage 222B, and cluster routers 224B connected by a local cluster network 226B. Likewise, server cluster 220C may include one or more server devices 200C, cluster data storage 222C, and cluster routers 224C connected by a local cluster network 226C. Server clusters 220A, 220B, and 220C may communicate with network 108 via communication links 228A, 228B, and 228C, respectively.

In some embodiments, each of the server clusters 220A, 220B, and 220C may have an equal number of server devices, an equal number of cluster data storages, and an equal number of cluster routers. In other embodiments, however, some or all of the server clusters 220A, 220B, and 220C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 220A, for example, server devices 200A can be configured to perform various computing tasks of server device 110. In one embodiment, these computing tasks can be distributed among one or more of server devices 200A. Server devices 200B and 200C in server clusters 220B and 220C may be configured the same or similarly to server devices 200A in server cluster 220A. On the other hand, in some embodiments, server devices 200A, 200B, and 200C each may be configured to perform different functions. For example, server devices 200A may be configured to perform one or more functions of server device 110, and server devices 200B and server device 200C may be configured to perform functions of one or more other server devices. Similarly, the functions of server data storage device 112 can be dedicated to a single server cluster, or spread across multiple server clusters.

Cluster data storages 222A, 222B, and 222C of the server clusters 220A, 220B, and 220C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 110 and server data storage device 112 can be distributed across server clusters 220A, 220B, and 220C, various active portions and/or backup/redundant portions of these components can be distributed across cluster data storages 222A, 222B, and 222C. For example, some cluster data storages 222A, 222B, and 222C may be configured to store backup versions of data stored in other cluster data storages 222A, 222B, and 222C.

Cluster routers 224A, 224B, and 224C in server clusters 220A, 220B, and 220C, respectively, may include networking equipment configured to provide internal and external communications for the server clusters. For example, cluster routers 224A in server cluster 220A may include one or more packet-switching and/or routing devices configured to provide (i) network communications between server devices 200A and cluster data storage 222A via cluster network 226A, and/or (ii) network communications between the server cluster 220A and other devices via communication link 228A to network 108. Cluster routers 224B and 224C may include network equipment similar to cluster routers 224A, and cluster routers 224B and 224C may perform networking functions for server clusters 220B and 220C that cluster routers 224A perform for server cluster 220A.

Additionally, the configuration of cluster routers 224A, 224B, and 224C can be based at least in part on the data communication requirements of the server devices and cluster storage arrays, the data communications capabilities of the network equipment in the cluster routers 224A, 224B, and 224C, the latency and throughput of the local cluster networks 226A, 226B, 226C, the latency, throughput, and cost of the wide area network connections 228A, 228B, and 228C, and/or other factors that may contribute to the cost, speed, fault-tolerance, resiliency, efficiency and/or other design goals of the system architecture.

D. Client Device

Figure 3:
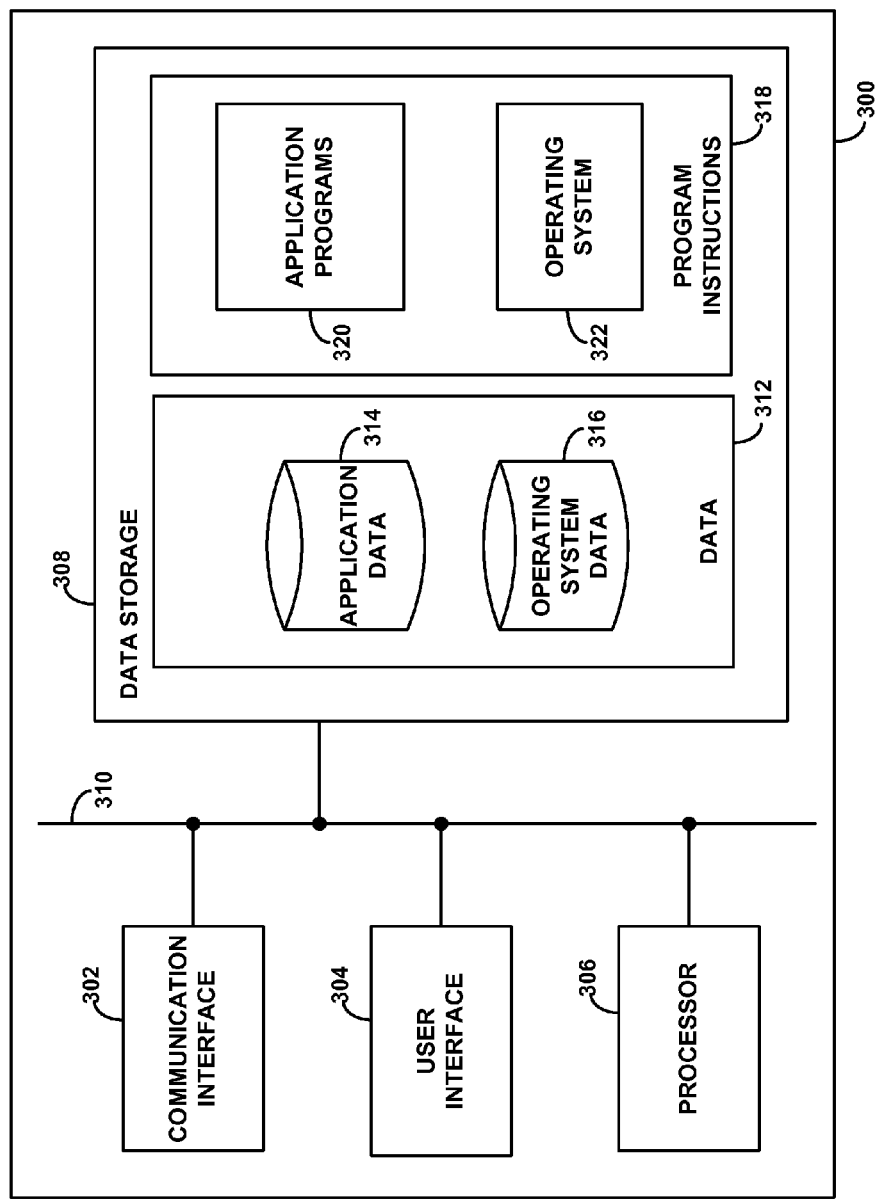
FIG. 3 depicts a block diagram of a client device, in accordance with an example embodiment.

FIG. 3 is a simplified block diagram showing some of the components of an example client device 300. By way of example and without limitation, client device 300 may be a "plain old telephone system" (POTS) telephone, a cellular mobile telephone, a still camera, a video camera, a fax machine, an answering machine, a computer (such as a desktop, notebook, or tablet computer), a personal digital assistant (PDA), a home automation component, a digital video recorder (DVR), a digital TV, a remote control, or some other type of device equipped with one or more wireless or wired communication interfaces.

As shown in FIG. 3, client device 300 may include a communication interface 302, a user interface 304, a processor 306, and data storage 308, all of which may be communicatively linked together by a system bus, network, or other connection mechanism 310.

Communication interface 302 functions to allow client device 300 to communicate, using analog or digital modulation, with other devices, access networks, and/or transport networks. Thus, communication interface 302 may facilitate circuit-switched and/or packet-switched communication, such as POTS communication and/or IP or other packetized communication. For instance, communication interface 302 may include a chipset and antenna arranged for wireless communication with a radio access network or an access point. Also, communication interface 302 may take the form of a wireline interface, such as an Ethernet, Token Ring, or USB port. Communication interface 302 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 302. Furthermore, communication interface 302 may comprise multiple physical communication interfaces (e.g., a Wifi interface, a BLUETOOTH® interface, and a wide-area wireless interface).

User interface 304 may function to allow client device 300 to interact with a human or non-human user, such as to receive input from a user and to provide output to the user. Thus, user interface 304 may include input components such as a keypad, keyboard, touch-sensitive or presence-sensitive panel, computer mouse, trackball, joystick, microphone, still camera and/or video camera. User interface 304 may also include one or more output components such as a display screen (which, for example, may be combined with a presence-sensitive panel), CRT, LCD, LED, a display using DLP technology, printer, light bulb, and/or other similar devices, now known or later developed. User interface 304 may also be configured to generate audible output(s), via a speaker, speaker jack, audio output port, audio output device, earphones, and/or other similar devices, now known or later developed. In some embodiments, user interface 304 may include software, circuitry, or another form of logic that can transmit data to and/or receive data from external user input/output devices. Additionally or alternatively, client device 300 may support remote access from another device, via communication interface 302 or via another physical interface (not shown).

Processor 306 may comprise one or more general purpose processors (e.g., microprocessors) and/or one or more special purpose processors (e.g., DSPs, GPUs, FPUs, network processors, or ASICs). Data storage 308 may include one or more volatile and/or non-volatile storage components, such as magnetic, optical, flash, or organic storage, and may be integrated in whole or in part with processor 306. Data storage 308 may include removable and/or non-removable components.

Generally speaking, processor 306 may be capable of executing program instructions 318 (e.g., compiled or non-compiled program logic and/or machine code) stored in data storage 308 to carry out the various functions described herein. Therefore, data storage 308 may include a non-transitory computer-readable medium, having stored thereon program instructions that, upon execution by client device 300, cause client device 300 to carry out any of the methods, processes, or functions disclosed in this specification and/or the accompanying drawings. The execution of program instructions 318 by processor 306 may result in processor 306 using data 312.

By way of example, program instructions 318 may include an operating system 322 (e.g., an operating system kernel, device driver(s), and/or other modules) and one or more application programs 320 (e.g., address book, email, web browsing, social networking, and/or gaming applications) installed on client device 300. Similarly, data 312 may include operating system data 316 and application data 314. Operating system data 316 may be accessible primarily to operating system 322, and application data 314 may be accessible primarily to one or more of application programs 320. Application data 314 may be arranged in a file system that is visible to or hidden from a user of client device 300.

Application programs 320 may communicate with operating system 312 through one or more application programming interfaces (APIs). These APIs may facilitate, for instance, application programs 320 reading and/or writing application data 314, transmitting or receiving information via communication interface 302, receiving or displaying information on user interface 304, and so on.

In some vernaculars, application programs 320 may be referred to as "apps" for short. Additionally, application programs 320 may be downloadable to client device 300 through one or more online application stores or application markets. However, application programs can also be installed on client device 300 in other ways, such as via a web browser or through a physical interface (e.g., a USB port) on client device 300.

3. Example Automatic Speech Recognition System Training

Before describing ASR system training in detail, it may be beneficial to understand overall ASR system operation. Thus, this section describes ASR systems in general, including how the language model can interact with other logical components of an ASR system in order to facilitate speech recognition.

Figure 4:
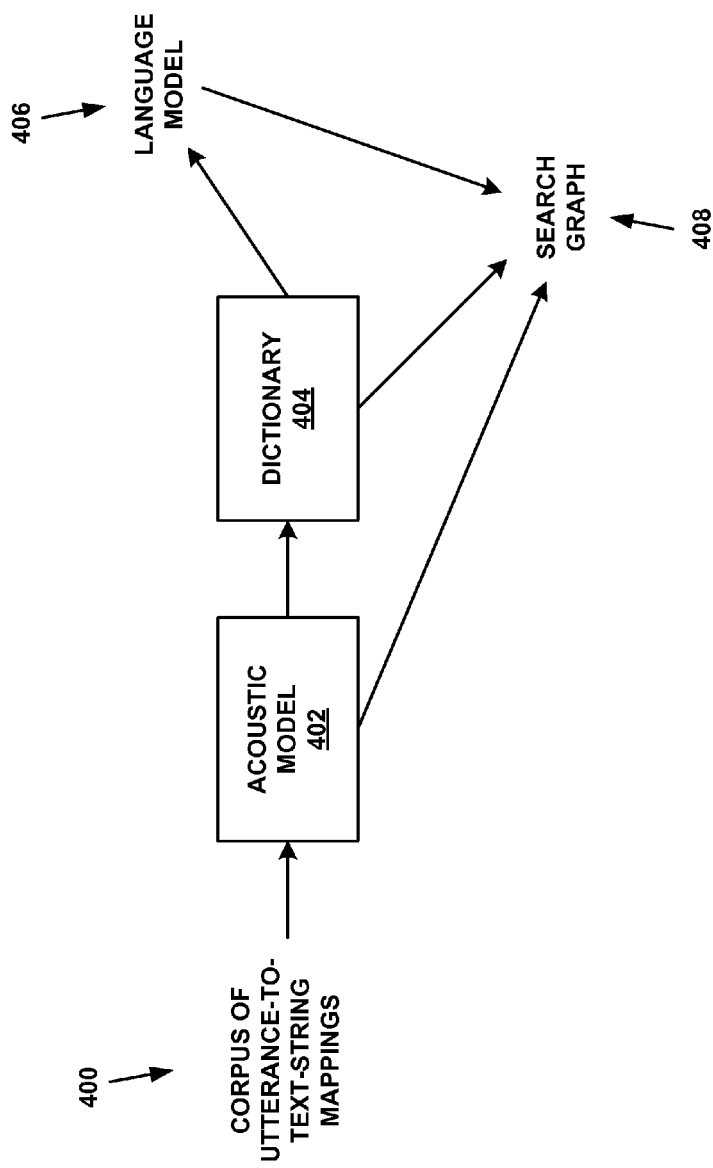
FIG. 4 depicts training an ASR system, in accordance with an example embodiment.

FIG. 4 depicts a representation of how an ASR system may be trained. The input to ASR system training may be a corpus of utterance-to-text-string mappings 400. These mappings may include utterances of human speech each associated with at least one transcription to a text string representation of the respective utterance. In some embodiments, these transcriptions may be high-accuracy manual and/or automatic transcriptions.

It should be noted that the discussion in this section, and the accompanying figures, are presented for purposes of example. Other methods of training an ASR system, including different modules, different configurations of modules, and/or different training steps, may be possible.

A. Acoustic Model

A phoneme may be considered to be the smallest segment of an utterance that encompasses a meaningful contrast with other segments of utterances. Thus, a word typically includes one or more phonemes. For purposes of simplicity, phonemes may be thought of as utterances of letters, but this is not a perfect analogy, as some phonemes may present multiple letters. An example phonemic spelling for the American English pronunciation of the word "cat" is "kaet," consisting of the phonemes "k," "ae," and "t." Another example phonemic spelling is "d aw g," consisting of the phonemes "d," "aw," and "g."

Different phonemic alphabets exist, and these alphabets may have different textual representations for the various phonemes therein. For example, the letter "a" may be represented by the phoneme "ae" when used to make the "a" sound in "cat," by the phoneme "ey" when used to make the "a" sound in "ate," and by the phoneme "ah" when used to make the "a" sound in "beta." Other phonemic representations are possible.

Common phonemic alphabets for American English contain about 40 distinct phonemes. Each of these phonemes may be associated with a different set of nominal output vector values. Thus, acoustic model 402 may be able to estimate the phoneme in the sample by analyzing the sample in the time and/or frequency domains, and finding the phoneme with nominal output vector values (e.g., frequency characteristics) that best match the output vector values of the sample. Or, put another way, acoustic model 402 can be used to provide scores every s milliseconds that describe how well the current sound in an utterance matches some or all possible context dependent phonemic sounds.

Figure 5:
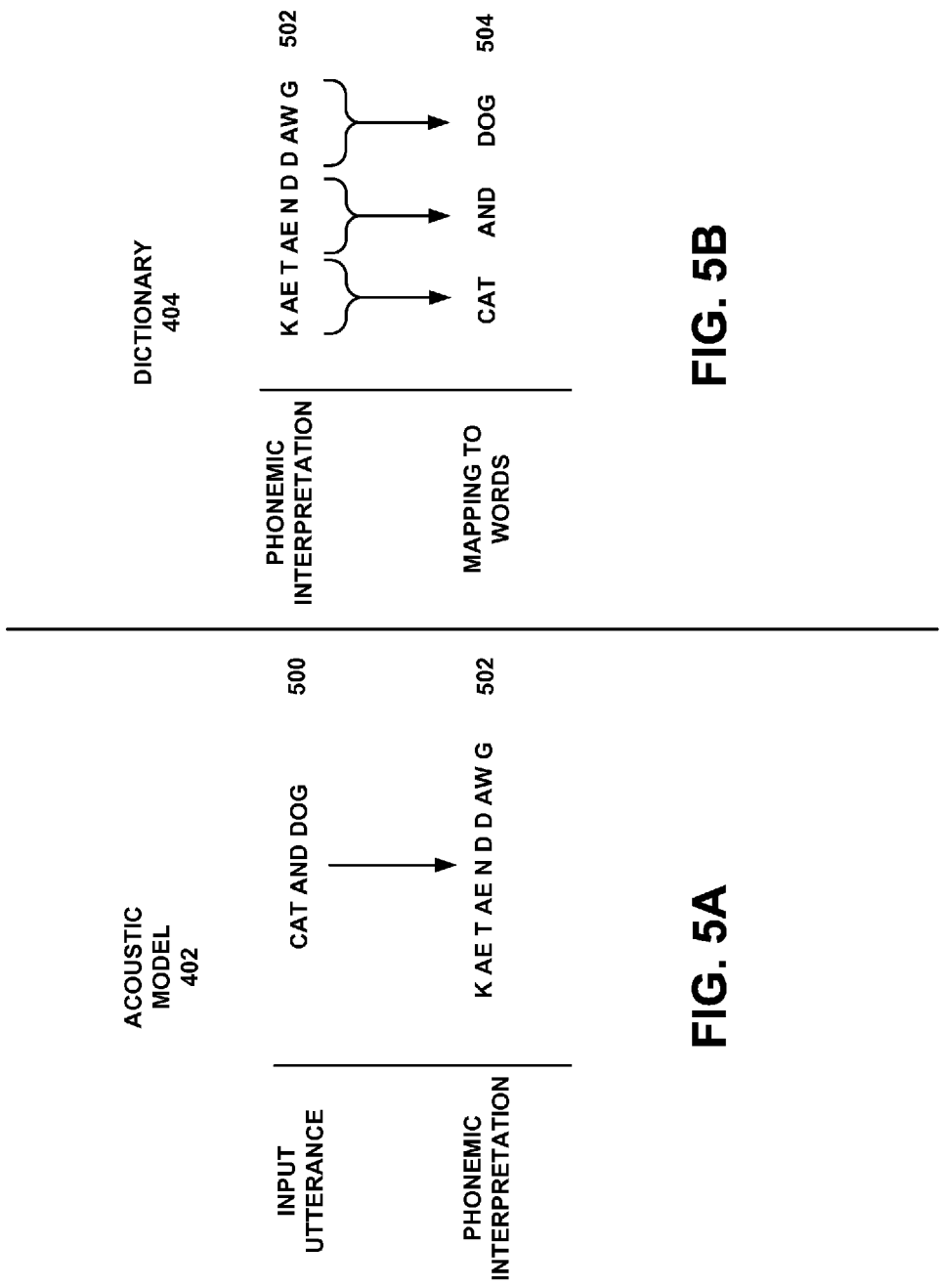
FIG. 5A depicts an aspect of ASR system acoustic model processing, in accordance with an example embodiment.
FIG. 5B depicts an aspect of ASR system dictionary processing, in accordance with an example embodiment.

This process is illustrated in FIG. 5A. For the input utterance "cat and dog" 500, acoustic model 402 may phonemically interpret this utterance as "k ae t ae n d d aw g" 502. FIG. 5A assumes that the input utterance is clean and that acoustic model 402 is well-trained. In some environments, the input utterance may be distorted by background noise, clipping, or some other form of interference. Also, for some input utterances, particularly those with uncommon words or words spoken with an unknown accent, acoustic model 402 may incorrectly evaluate the input utterance.

One way of implementing an acoustic model, such as acoustic model 402, is by using a hidden Markov model (HMM). Some HMM-based acoustic models may also consider context when performing this mapping. For example, acoustic model 402 may consider the phoneme that precedes the current sample to provide a better estimate of the phoneme represented by the current sample. The use of context in this fashion can account for certain phoneme combinations (e.g., "aet") being more common than other phoneme combinations (e.g., "tk"). But, HMMs are just one technology that can be employed to develop an acoustic model, and acoustic model 402 can be based on technology other than HMMs.

Furthermore, acoustic model 402 may operate based on syllables or a segment of language other than context-dependent phonemic sounds. For instance, acoustic model 402 may interpret a series of phonemes as syllables, or as one or more words. For purposes of simplicity, throughout this specification and the accompanying drawings, it is assumed that acoustic models represent one or more phonemes as context-dependent phonemic sounds. However, acoustic models that use other types of representations are within the scope of the embodiments herein.

B. Dictionary

Once one or more phonemes are interpreted from an input utterance, dictionary 404 may be used to determine a pre-established mapping (e.g., from a list of tens or hundreds of thousands of phoneme pattern to word mappings) of these phonemes into words. This process is illustrated by FIG. 5B. For the input phonemic interpretation "k ae t ae n d d aw g" 502, dictionary 404 provides a mapping to the text string "cat and dog."

TABLE 1

| Word | Phonemic Interpretation |
|---|---|
| cat | k ae t |
| and | ay n d |
| dog | d aw g |

In some embodiments, dictionary 404 may include a lookup table, such as Table 1. Table 1 illustrates how dictionary 404 may list the phonemic sequences that search graph 408 uses for the words that the ASR system is attempting to recognize.

C. Language Model

Turning back to FIG. 4, one output of the ASR system training process may be language model 406. Language model 406 may define the conditional probability of $w_n$ (the nth word in a phrase transcribed from an utterance), given the values of the pattern of n–1 previous words in the phrase. More formally, language model 406 may define $$P(w_n | w_1, w_2, \ldots, w_{n-1})$$

In general, a language model may operate on n-grams, which, for example, may be sequences of n words that were recognized from the utterances in corpus 400, via acoustic model 402 and dictionary 404. Alternatively or additionally, the n-grams may be derived from a corpus of phrases and sentences written in a target language.

In some embodiments, a language model may operate on a sequence of n phonemes, syllables, words, or series of words. In practice, language models with values of n greater than 5 are rarely used, because of their computational complexity, and also because smaller n-grams (e.g., 3-grams, which are also referred to as tri-grams) tend to yield acceptable results. In the example described below, tri-grams are used for purposes of illustration. Nonetheless, any value of n may be may be used with the embodiments herein.

Thus, through analysis of the corpus 400, tri-gram probabilities can be estimated based on their respective number of appearances in the training corpus. In other words, if $C(w_1, w_2, w_3)$ is the number of occurrences of the word pattern $w_1, w_2, w_3$ in corpus 400, then $$P(w_3 \mid w_1, w_2) \approx \frac{C(w_1, w_2, w_3)}{C(w_1, w_2)}$$

Therefore, a language model may be represented as a table of conditional probabilities. Table 2 illustrates a simple example of such a table that could form the basis of language model 406. Particularly, Table 2 contains tri-gram conditional probabilities.

TABLE 2

Tri-gram Conditional Probabilities

P(dog|cat,and) = 0.5
P(mouse|cat,and) = 0.35
P(bird|cat,and) = 0.14
P(fiddle|cat,and) = 0.01

For the 2-gram prefix "cat and," Table 2 indicates that, based on the observed occurrences in corpus 400, 50% of the time the next 1-gram is "dog." Likewise, 35% of the time, the next 1-gram is "mouse," 14% of the time the next 1-gram is "bird," and 1% of the time the next 1-gram is "fiddle." Clearly, in a fully-trained ASR system, the language model would contain many more entries, and these entries would include more than just one 2-gram prefix.

Nonetheless, using the observed frequencies of word patterns from a corpus of speech (and/or from other sources) is not perfect, as some acceptable tri-grams may not appear in the training corpus, and may therefore be assigned a probability of zero. Consequently, when given a zero-probability tri-gram at run time, the language model may instead attempt to map this tri-gram to a different tri-gram associated with a non-zero probability.

In order to reduce this likelihood, the language model may be smoothed so that zero-probability tri-grams have small non-zero probabilities, and the probabilities of the tri-grams in the training corpus are reduced accordingly. In this way, tri-grams not found in the training corpus can still be recognized by the language model.

D. Search Graph

Another possible output from the ASR training process illustrated in FIG. 4 is a search graph, such as search graph 408. A search graph may be a data structure that represents the totality (or a large part of) the speech patterns of an input corpus, and may serve to enable rapid recognition of new input utterances in an operational ASR system. Thus, search graph 408 may be based on output from acoustic model 402, dictionary 404, and language model 406.

Figure 6:
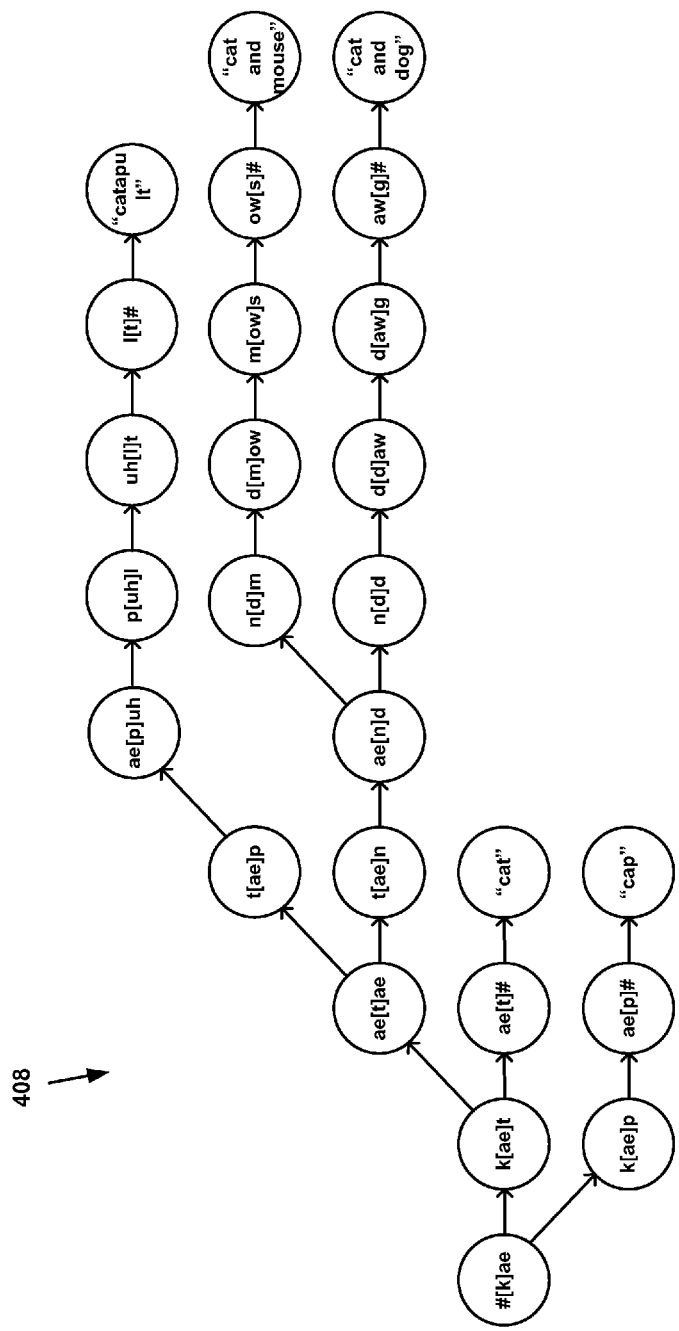
FIG. 6 depicts an ASR system search graph, in accordance with an example embodiment.

FIG. 6 illustrates a possible embodiment of search graph 408. In order to be illustrative, search graph 408 is much smaller and less complex than a search graph that would be used in an actual ASR system. Particularly, search graph 600 was trained with only the five input utterances, "catapult," "cat and mouse," "cat and dog," "cat," and "cap."

Each circle in search graph 408 may represent a state associated with the processing of an input utterance that has been mapped to phonemes. These states are named based on the current phoneme context of the input utterance, using the format "x[y]z" to indicate that the current phoneme being considered, y, has a left-context of the phoneme x and a right context of the phoneme z. In other words, the state "x[y]z" indicates a point in processing an utterance in which the current phoneme being considered is y, the previously phoneme in the utterance is x, and the next phoneme in the utterance is z. The beginning of an utterance and the end of an utterance are represented by the "#" character, and also may be referred to as null phonemes.

Terminal states may be represented by a recognized word or phrase in quotes. Search graph 408 includes five terminal states, representing recognition of the words or phrases "catapult," "cat and mouse," "cat and dog," "cat," and "cap."

Transitions from one state to another may represent an observed ordering of phonemes in the corpus. For instance, the state "#[k]ae" represents the recognition of a "k" phoneme with a left context of a null phoneme and a right context of an "ae" phoneme. There are two transitions from the state "#[k]ae"—one for which the next phoneme (the phoneme after the "ae") is a "t" and another for which the next phoneme is a "p."

Based on acoustic model 402, dictionary 404, and language model 406, costs may be assigned to one or more of the states and/or transitions. For example, if a particular phoneme pattern is rare, a transition to a state representing that phoneme pattern may have a higher cost than a transition to a state representing a more common phoneme pattern. Similarly, the conditional probabilities from the language model (see Table 2 for examples) may also be used to assign costs to states and/or transitions. For instance, in Table 2, given a phrase with the words "cat and," the conditional probability of the next word in the phrase being "dog" is 0.5, while the conditional probability of the next word in the phrase being "mouse" is 0.35. Therefore, the transition from state "ae[n]d" to state "n[d]m" may have a higher cost than the transition from state "ae[n]d" to state "n[d]d."

Once an ASR system is trained, search graph 408, possibly including any states, transitions between states, and associated costs therein, may be used to estimate text string transcriptions for new input utterances. The next section describes ASR system operation in more detail.

4. Example Automatic Speech Recognition System Operation

Figure 7:
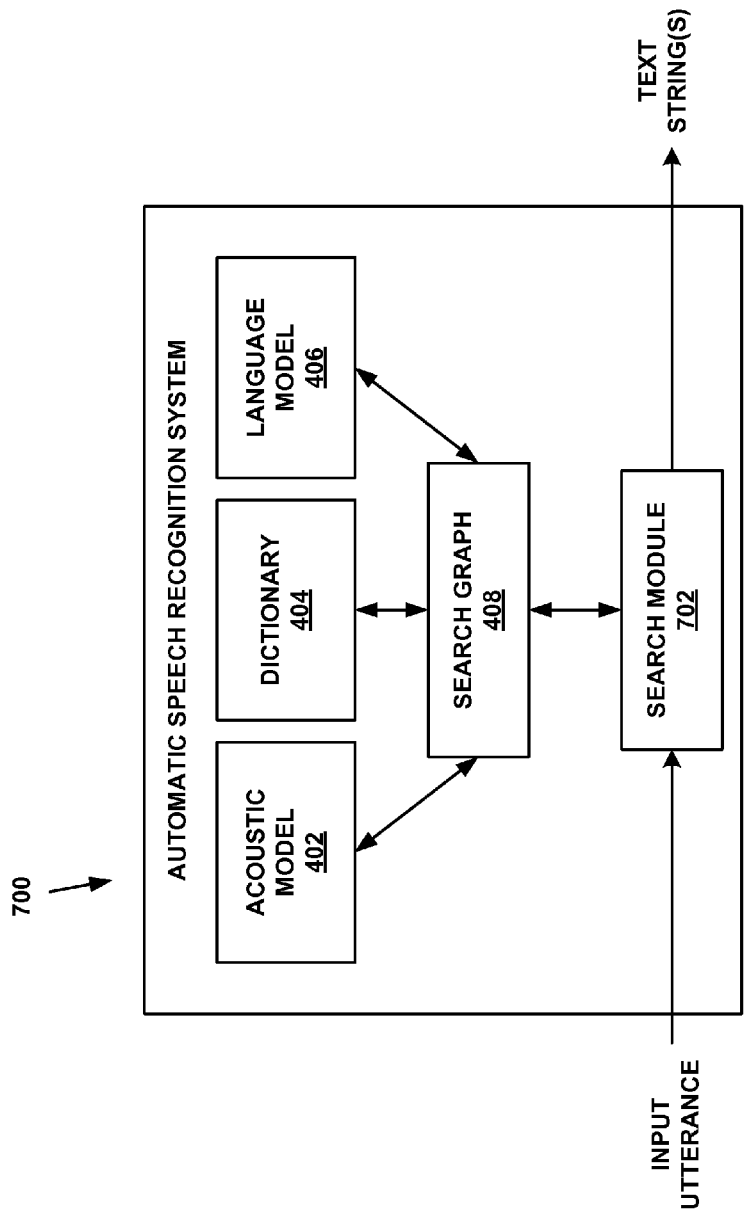
FIG. 7 depicts operating an ASR system, in accordance with an example embodiment.

An illustrative model of an operational ASR system is shown in FIG. 7. Example ASR system 700 may include representations of acoustic model 402, dictionary 404, language model 406, and search graph 408. Alternatively, ASR system 700 may omit one or more of these modules. For example, characteristics of dictionary 404 and language model 406 may be incorporated into the structure of search graph 408, and therefore may not be necessary in ASR system 700.

Input to ASR system 700 may be an input utterance, such as a word, a phrase, a sentence, or a series of sentences. The input utterance may take the form of an analog or digital audio signal. Output from ASR system 700 may be one or more text strings that the ASR system has transcribed based on the input utterance. While ASR system 700 may seek to produce accurate text string transcriptions of input utterances, this may not always be possible. Thus, for some input utterances, ASR system 700 may produce more than one possible text string transcription that could match the input utterance. For instance, ASR system 700 may estimate the N-best transcriptions of an input utterance, and output one or more of these transcriptions.

Additionally, FIG. 7 shows search module 702 being coupled with search graph 408, and search graph 408 being coupled with acoustic model 402, dictionary 404, and language model 406. However, other arrangements are possible. For instance, search module 702 may interact directly with acoustic model 402 and/or dictionary 404.

Search module 702 may be used to determine a sequence of one or more words that matches an input utterance. Formally, search module 702 may attempt to find $$w^* = \operatorname{argmax}_w P(a|w)P(w)$$

where a is a stream of feature vectors derived from the input utterance, P(a|w) represents the probability of those feature vectors being produced by a word sequence w, and P(w) is the probability assigned to w by language model 406. For example, P(w) may be based on n-gram conditional probabilities as discussed above, as well as other factors. The function $\operatorname{argmax}_w$ may return the value of w that maximizes P(a|w)P(w).

Particularly, as part of the process of transcribing the input utterance to one or more text strings, search module 702 may apply acoustic model 402 to the input utterance. The result of this step may be a sequence of phonemes. Then, the sequence may serve as input to search graph 408. In some embodiments, search module 702 may attempt to find paths from an initial state in search graph 408 to a terminal state in search graph 408 based on this sequence. This process may involve search module 702 performing a breadth-first search, depth-first search, beam search, or some other type of search. Search module 702 may assign a total cost to one or more paths based on costs associated with the states and/or transitions of each path. Some of these costs may reflect, for instance, a confidence level that a particular segment of the utterance maps to a particular phoneme context in the path.

As an example, suppose that the input utterance is the phrase "cat and dog." Referring back to FIG. 6, in a possible scenario, search module 702 would step through search graph 408 phoneme by phoneme and find the path beginning with initial state "#[k]ae" and ending with terminal state "cat and dog." Search module 702 may also find one or more additional paths through search graph 408. For example, search module 702 may also associate the input utterance with the path with initial state "#[k]ae" and ending with terminal state "cat and mouse," and with the path with initial state "#[k]ae" and ending with terminal state "catapult." Nonetheless, search module 702 may assign a lower cost to the path with terminal state "cat and dog" than to each of the other paths. Consequently, the path with terminal state "cat and dog" may be selected as the "best" transcription for the input utterance.

It should be understood that ASR systems can operated in many different ways. The embodiments described above are presented for purposes of illustration and may not be the only way in which an ASR system operates.

5. Example Embodiments to Compress Word Frequencies

As noted above, in many human languages, the distributions of words used in speech follow Zipf's Law. Thus, for a given corpus of utterance-to-text-string mappings, the probabilities assigned to n-grams by an ASR system's language model may be in accordance with these distributions. Consequently, an ASR system is likely to misinterpret words that appear rarely in speech as more commonly-occurring words.

In some cases, the utterances in the training corpus may further bias the ASR system due to their source. For instance, the corpus may include voice-to-text utterances from text messaging and instant messaging applications. The distribution of words used for text messaging and instant messaging applications may differ from the distribution of words used in other contexts, such as human conversation. In particular, text messages and instant messages typically contain sentence fragments rather than whole sentences, and may include a disproportionate amount of slang.

Moreover, at least in American English, common usage results in the slurring of phonemes in various phrases. For example, the input utterance "talk to you later," may be pronounced as "talk tuh ya later." Thus, for example, the highest scoring (e.g., lowest cost) phoneme string may be: "t ao k t ah y aa l ey t er."

However, due to the training process (and possibly the longer span constraints from the dictionary and the language model), an ASR system may learn to transcribe this phoneme string to the proper text string of "talk to you later." As a result, the acoustic model, which may use phoneme context to perform its interpretation, may learn that an "uw" phoneme with a left context of a "t" phoneme and a right context of a "y" phoneme sometimes sounds like an "ah" phoneme.

This mapping can be problematic, as new utterances introduced to the ASR system during operation may be subject to the model of the "uw" phoneme being contaminated with the "ah" sound in some contexts. This may cause problems in other contexts where that type of substitution ("uw" to "ah") is not common. For instance, the input utterance "about you" might be interpreted as the phoneme string "aa b aw t ah y uw." (Here, the speaker has put an emphasis on the "t" in "about" so that it sounds as if the "ah" phoneme is appended). Since the "ah" phoneme has a left context of a "t" phoneme and a right context of a "y", the ASR system may map the phonemes in "about you" to the words "a bow to you."

Regardless, this is just one possible example of how common phrases and/or high-frequency words can lead an ASR system to misinterpret input utterances. Many other examples are possible. The example techniques introduced below may reduce the likelihood of these (and possibly other) types of ASR system misinterpretations.

TABLE 3

| Rank | Word | True word frequency in corpus | Compressed frequency (0.5 power) | Word selection probability |
|---|---|---|---|---|
| 1 | the | 56,265,001 | 7501 | 0.00013 |
| 2 | of | 33,942,276 | 5826 | 0.00017 |
| 3 | and | 29,942,784 | 5472 | 0.00018 |
| 4 | to | 25,948,836 | 5094 | 0.00020 |
| 5 | in | 17,413,929 | 4173 | 0.00024 |
| ... | | | | |
| 100 | own | 921,600 | 960 | 0.00104 |
| ... | | | | |
| 1046 | dog | 76176 | 276 | 0.00362 |
| ... | | | | |
| 2567 | cat | 30,625 | 175 | 0.00571 |
| ... | | | | |
| 20734 | catapult | 441 | 21 | 0.04762 |

Table 3 contains an illustrative list of words from an example corpus. These words are ranked according to their true word frequencies. (The term "true word frequency" is used herein to refer to the frequency of words in the corpus used to train an ASR system, and to distinguish from the term "compressed word frequency" that is discussed below.) The rank ordering indicates that the word "the" has a rank of 1 and therefore is the most common, the word "of" has a rank of 2 and therefore is the second most common, and so on.

As noted earlier, true word frequencies typically follow Zipf's Law. Thus, in the example corpus, "of" appears about half as often as "the," and the third most common word, "and" appear about one-third as often as "the." (While the example word frequencies in Table 3 do not follow Zipf's Law exactly, they are close enough to be well-modeled with Zipf's Law.)

Further, and again in accordance with Zipf's Law, the true word frequency distribution in the example corpus is "high variance" or "heavy tailed," in that there are many low-frequency words. For instance, the word "catapult" has a rank of 20734, but appears only 441 times in the example corpus. Since the word "cat" appears about 70 times more frequently than "catapult," the ASR system may be biased toward misinterpreting "catapult" as "cat," followed by one or more additional words, when "catapult" appears in an input utterance.

One possible way of mitigating misinterpretations due to word frequency bias is to train the ASR system with input utterances that are more likely to contain low-frequency words. For example, Table 3 contains, for each word, a compressed frequency which is formed by taking the square root of the true word frequency. As can be observed from Table 3, and verified mathematically, the word distribution formed in accordance with the compressed word frequencies has a lower variance and is less heavy-tailed than the true word frequency distribution.

Compressed frequencies can be derived in other ways as well. For example, a compressed word frequency can be obtained by raising the true word frequency to a power between 0.0 and 1.0 (taking the square root of the true word frequency is equivalent to raising the true word frequency to a power of 0.5).

Generally speaking, the value of the power may be used as a knob to control the variance of the distribution of compressed word frequencies. The higher the power, the greater the variance of the distribution. For example, if the power is 1.0, the distribution of compressed word frequencies is the same as that of the high-variance true word frequencies. However, if the power is 0.5, as shown in Table 3, the distribution of compressed word frequencies has a lower variance than the distribution of true word frequencies. Further, if the power is 0.0, the distribution of compressed word frequencies is uniform, with a variance of 0 (i.e., the compressed word frequency for every word is 1).

A word selection probability may be derived by dividing the compressed word frequency by the true word frequency. Alternatively, the word selection probability may be derived in other ways. The word selection probability may be used to sample the training corpus. For instance, the word selection probability for a particular word represents the approximate likelihood that an input utterance containing the particular word in the training corpus will be sampled from the training corpus. With reference to Table 3, this means that any one of the 76176 instances of the word "dog" in the training corpus may be selected with a probability of 0.00362.

More specifically, for an input utterance containing n words, the input utterance may be selected from the training corpus based on the word selection probabilities of each of the n words. In some embodiments, the average (mean) of the word selection probabilities of n words may be calculated, and the input utterance may be sampled with a probability equivalent to this average. Alternatively, the geometric mean, harmonic mean, or some other measure of central tendency may be used. A geometric mean of n numbers, $a_1, a_2 \ldots a_n$ may be calculated as $$\sqrt[n]{\prod_{i=1}^{n} a_i}.$$

A harmonic mean of the same n numbers may be calculated as $$\frac{n}{\sum_{i=1}^{n} \frac{1}{a_i}}.$$

Figure 8:
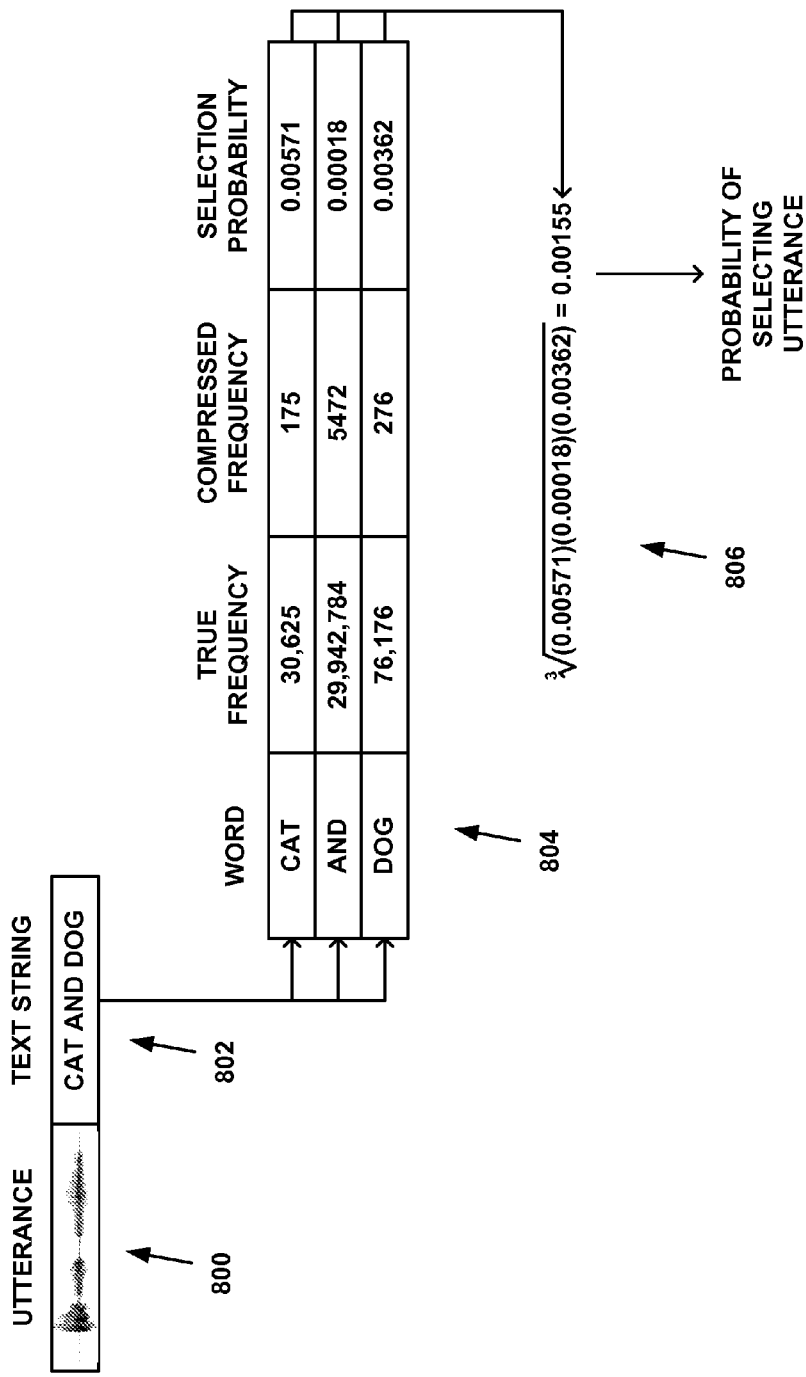
FIG. 8 depicts sampling an utterance-to-text-string corpus, in accordance with an example embodiment.

Determining the selection probability of an utterance is illustrated in FIG. 8. Utterance 800 maps to text string "cat and dog" 802. For each word in text string "cat and dog" 802, a true word frequency and a compressed word frequency is determined, as shown in table 804. Then, the compressed word frequencies are divided by their respective true word frequencies, resulting in selection probabilities for each word. (The true word frequencies, compressed word frequencies, and selection probabilities for these example words are taken from Table 3.)

The geometric mean of the selection probabilities 806 is then calculated, resulting in the value 0.00155. This value may be used as the probability of selecting utterance 800 from the corpus of training data for the ASR system. For instance, a uniformly-distributed random number between 0 and 1 may be generated. If the random number is less than or equal to 0.00155, the utterance may be selected. If the random number is greater than 0.00155, the utterance may not be selected.

After a number of samples (e.g., thousands, tens of thousands, hundreds of thousands, or millions, etc.) are selected in this fashion from the corpus, the ASR system may be trained with these samples. This sample-based training may occur after the ASR system has already been trained with the full set of utterances from the corpus, or instead of training the ASR system with the full set of utterances from the corpus.

A possible result of training an ASR with the samples selected based on the compressed probabilities is that low-frequency words will be more heavily represented in the ASR system. Thus, the ASR system's bias toward high-frequency words may be reduced.

6. Example Operations

Figure 9:
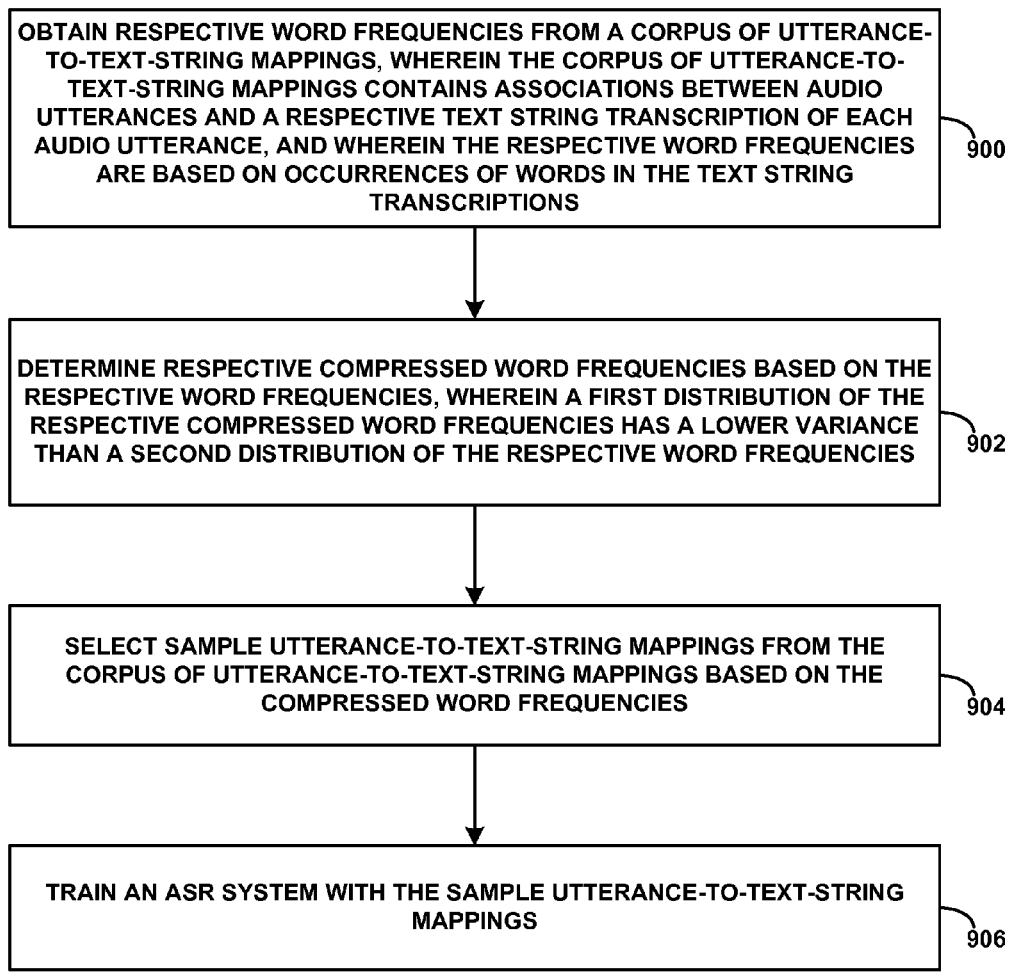
FIG. 9 is a flow chart, in accordance with an example embodiment.

FIG. 9 is a flow chart of an example embodiment. The steps illustrated by this flow chart may be carried out by one or more computing devices, such as server device 200 or server cluster 220A. Further, aspects of each individual step may be distributed between multiple computing devices.

At step 900, respective word frequencies may be obtained from a corpus of utterance-to-text-string mappings. The corpus of utterance-to-text-string mappings may contain associations between audio utterances and a respective text string transcription of each audio utterance, and the respective word frequencies may be based on occurrences of words in the text string transcriptions. For example, a histogram may be developed that associates words in the text string transcriptions in the corpus of utterance-to-text-string mappings with a respective count of occurrences of the words, and the respective word frequencies may be obtained from the respective counts.

At step 902, respective compressed word frequencies may be determined based on the respective word frequencies. In some embodiments, the distribution of the respective compressed word frequencies may have a lower variance than the distribution of the respective word frequencies. For example, each of the respective word frequencies may be raised to a power less than 1 to form the respective compressed word frequencies. The power may also be greater than 0, and thus may be anywhere within the range of 0 to 1, including, for instance, 0.5.

At step 904, sample utterance-to-text-string mappings may be selected from the corpus of utterance-to-text-string mappings based on the compressed word frequencies. The sample utterance-to-text-string mappings may include a particular utterance mapped to a particular text string, and wherein the particular text string contains a first word. The selecting may involve determining a first word selection probability for the first word based on a first compressed word frequency of the first word divided by a first word frequency of the first word. Then, the particular utterance may be selected based on the first word selection probability.

Additionally, the particular text string may also contain a second word, and the selecting may also involve determining a second word selection probability for the second word based on a second compressed word frequency of the second word divided by a second word frequency of the second word. Then, selecting the particular utterance may be based on the first word selection probability and second word selection probability.

In some embodiments, selecting the particular utterance based on the first word selection probability and second word selection probability may include calculating an arithmetic mean of the first word selection probability and the second word selection probability, and selecting the particular utterance with a probability of the arithmetic mean. Alternatively or additionally, selecting the particular utterance based on the first word selection probability and second word selection probability may include calculating a geometric mean of the first word selection probability and the second word selection probability, and selecting the particular utterance with a probability of the geometric mean.

At step 906, an ASR system may be trained with the sample utterance-to-text-string mappings. In some implementations, before training the ASR system with the sample utterance-to-text-string mappings, the ASR system may be trained with the entire corpus of utterance-to-text-string mappings.

7. Conclusion

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique.

The program code and/or related data may be stored on any type of computer-readable medium such as a storage device, including a disk drive or a hard drive, or other storage media.

The computer-readable medium may also include non-transitory computer-readable storage media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   determining a first compressed word frequency by raising a first uncompressed word frequency to a power, wherein the power is greater than or equal to 0 and less than 1;
   determining a second compressed word frequency by raising a second uncompressed word frequency to the power;
   selecting sample utterance-to-text-string mappings from a corpus of utterance-to-text-string mappings based on the first and second compressed word frequencies; and
   training an automatic speech recognition (ASR) system with the sample utterance-to-text-string mappings.

2. The method of claim 1, wherein the first and second uncompressed word frequencies are based on occurrences of words in text string transcriptions of utterances.

3. The method of claim 1, wherein the power is also greater than or equal to 0.5.

4. The method of claim 1, wherein selecting the sample utterance-to-text-string mappings from the corpus of utterance-to-text-string mappings based on the first and second compressed word frequencies comprises:
   determining a first word selection probability for a first word based on the first compressed word frequency divided by a first word frequency of the first word, wherein the sample utterance-to-text-string mappings include a particular utterance mapped to a particular text string, and wherein the particular text string contains the first word; and
   selecting the particular utterance based on the first word selection probability.

5. The method of claim 4, wherein selecting the sample utterance-to-text-string mappings from the corpus of utterance-to-text-string mappings based on the first and second compressed word frequencies further comprises:
   determining a second word selection probability for a second word based on the second compressed word frequency divided by a second word frequency of the second word, wherein the particular text string also contains the second word; and selecting the particular utterance based on the first word selection probability and second word selection probability.

6. The method of claim 5, wherein selecting the particular utterance based on the first word selection probability and second word selection probability comprises:

calculating an arithmetic mean of the first word selection probability and the second word selection probability; and selecting the particular utterance with a probability of the arithmetic mean.

7. The method of claim 5, wherein selecting the particular utterance based on the first word selection probability and second word selection probability comprises:

calculating a geometric mean of the first word selection probability and the second word selection probability; and selecting the particular utterance with a probability of the geometric mean.

8. A system comprising:

a processor;

a transceiver;

data storage; and program instructions in the data storage that, upon execution the processor, cause the system to train an automatic speech recognition (ASR) system with sample utterance-to-text-string mappings, wherein the sample utterance-to-text-string mappings are selected from a corpus of utterance-to-text-string mappings based on a first compressed word frequency and a second compressed word frequency, wherein the first compressed word frequency was determined by raising a first uncompressed word frequency to a power, wherein the power is greater than or equal to 0 and less than 1, wherein the second compressed word frequency was determined by raising a second uncompressed word frequency to the power, and wherein at least one of the first compressed word frequency and the first uncompressed word frequency was received by the system via the transceiver.

9. The system of claim 8, wherein at least one of the second compressed word frequency and the second uncompressed word frequency was received by the system via the transceiver.

10. The system of claim 8, wherein the first and second uncompressed word frequencies are based on occurrences of words in text string transcriptions of utterances.

11. The system of claim 8, wherein the power is also greater than or equal to 0.5.

12. The system of claim 8, wherein the sample utterance-to-text-string mappings were selected by the system, and wherein selecting the sample utterance-to-text-string mappings comprises:

determining a first word selection probability for a first word based on the first compressed word frequency divided by a first word frequency of the first word, wherein the sample utterance-to-text-string mappings include a particular utterance mapped to a particular text string, and wherein the particular text string contains the first word; and selecting the particular utterance based on the first word selection probability.

13. The system of claim 12, wherein the sample utterance-to-text-string mappings were selected by the system, and wherein selecting the sample utterance-to-text-string mappings further comprises:

determining a second word selection probability for a second word based on the second compressed word frequency divided by a second word frequency of the second word, wherein the particular text string also contains the second word; and selecting the particular utterance based on the first word selection probability and second word selection probability.

14. The system of claim 13, wherein selecting the particular utterance based on the first word selection probability and second word selection probability comprises:

calculating an arithmetic mean of the first word selection probability and the second word selection probability; and selecting the particular utterance with a probability of the arithmetic mean.

15. The system of claim 13, wherein selecting the particular utterance based on the first word selection probability and second word selection probability comprises:

calculating a geometric mean of the first word selection probability and the second word selection probability; and selecting the particular utterance with a probability of the geometric mean.

16. A method comprising:

determining a first compressed word frequency based on a first uncompressed word frequency;

determining a second compressed word frequency based on a second uncompressed word frequency, wherein a first difference between the first uncompressed word frequency and the second uncompressed word frequency is greater than a second difference between the first compressed word frequency and the second compressed word frequency;

selecting sample utterance-to-text-string mappings from a corpus of utterance-to-text-string mappings based on the first and second compressed word frequencies; and training an automatic speech recognition (ASR) system with the sample utterance-to-text-string mappings.

17. The method of claim 16, wherein the first and second uncompressed word frequencies are based on occurrences of words in text string transcriptions of utterances.

18. The method of claim 16, wherein selecting the sample utterance-to-text-string mappings from the corpus of utterance-to-text-string mappings based on the first and second compressed word frequencies comprises:

determining a first word selection probability for a first word based on the first compressed word frequency divided by a first word frequency of the first word, wherein the sample utterance-to-text-string mappings include a particular utterance mapped to a particular text string, and wherein the particular text string contains the first word; and selecting the particular utterance based on the first word selection probability.

19. The method of claim 18, wherein selecting the sample utterance-to-text-string mappings from the corpus of utterance-to-text-string mappings based on the first and second compressed word frequencies further comprises:

determining a second word selection probability for a second word based on the second compressed word frequency divided by a second word frequency of the second word, wherein the particular text string also contains the second word; and selecting the particular utterance based on the first word selection probability and second word selection probability.

20. The method of claim 19, wherein selecting the particular utterance based on the first word selection probability and second word selection probability comprises:
calculating an arithmetic mean of the first word selection probability and the second word selection probability; and
selecting the particular utterance with a probability of the arithmetic mean.

* * * * *